US010199150B2

(12) United States Patent
Carrow et al.

(10) Patent No.: US 10,199,150 B2
(45) Date of Patent: Feb. 5, 2019

(54) POWER TRANSMISSION TOWER MOUNTED SERIES INJECTION TRANSFORMER

(71) Applicant: Smart Wires Inc., San Francisco, CA (US)

(72) Inventors: Joe Carrow, Oakland, CA (US); Ali Farahani, Orange, CA (US); Haroon Inam, San Jose, CA (US); David Munguia, San Jose, CA (US); Amrit Iyer, San Leandro, CA (US); Debrup Das, Union City, CA (US); Arthur Kelley, Napa, CA (US)

(73) Assignee: Smart Wires Inc., Union City, CA (US)

( * ) Notice: Subject to any disclaimer, the term of this patent is extended or adjusted under 35 U.S.C. 154(b) by 82 days.

(21) Appl. No.: 15/157,726

(22) Filed: May 18, 2016

(65) Prior Publication Data

US 2017/0169928 A1 Jun. 15, 2017

Related U.S. Application Data

(60) Provisional application No. 62/265,626, filed on Dec. 10, 2015.

(51) Int. Cl.
*H01F 27/06* (2006.01)
*G05F 1/12* (2006.01)
(Continued)

(52) U.S. Cl.
CPC ............... *H01F 27/06* (2013.01); *G05F 1/12* (2013.01); *H01F 38/14* (2013.01); *H02J 3/00* (2013.01)

(58) Field of Classification Search
CPC ............. H01F 5/00; H01F 27/28; H01F 27/06
(Continued)

(56) References Cited

U.S. PATENT DOCUMENTS 2,237,812 A 4/1941 De Blieux
2,551,841 A 5/1951 Kepple et al.
(Continued)

FOREIGN PATENT DOCUMENTS

CH 660094 3/1987
CN 103256337 8/2013
(Continued)

OTHER PUBLICATIONS

"International Search Report and Written Opinion of the International Searching Authority dated Feb. 2, 2017; International Application No. PCT/US2016/062358", (dated Feb. 2, 2017).
(Continued)

*Primary Examiner* — Tsz Chan
(74) *Attorney, Agent, or Firm* — Womble Bond Dickinson (US) LLP (57) ABSTRACT

The power transmission tower mounted series injection transformer (TMIT) injects impedance and/or voltage on a transmission tower power line. A tension bearing tower uses vertical and horizontal insulators to support and stabilize the TMIT. The TMIT can be much heavier than a transformer device clamped to the high-voltage transmission line. The TMIT is connected in series with the tension bearing tower's jumper allowing it to use a multi-turn transformer. By operating at the line voltage potential, the TMIT does not require the large bushings and oil drums used by sub-station injection transformers.

22 Claims, 10 Drawing Sheets

(51) Int. Cl.
*H01F 38/14* (2006.01)
*H02J 3/00* (2006.01)

(58) Field of Classification Search
USPC ........................................ 336/200, 232, 229
See application file for complete search history.

(56) References Cited

U.S. PATENT DOCUMENTS

| | | | |
|---|---|---|---|
| 3,556,310 A | 1/1971 | Loukotsky | |
| 3,704,001 A | 11/1972 | Sloop | |
| 3,750,992 A | 8/1973 | Johnson | |
| 3,913,003 A | 10/1975 | Felkel | |
| 4,025,824 A | 5/1977 | Cheatham | |
| 4,057,736 A | 11/1977 | Jeppson | |
| 4,103,853 A | 8/1978 | Bannan | |
| 4,164,345 A | 8/1979 | Arnold et al. | |
| 4,200,899 A | 4/1980 | Volman et al. | |
| 4,277,639 A | 7/1981 | Olsson | |
| 4,286,207 A | 8/1981 | Spreadbury et al. | |
| 4,323,722 A * | 4/1982 | Winkelman | H02G 7/20 174/43 |
| 4,367,512 A | 1/1983 | Fujita | |
| 4,514,950 A | 5/1985 | Goodson, Jr. | |
| 4,562,360 A | 12/1985 | Fujimoto | |
| 4,577,826 A | 3/1986 | Bergstrom et al. | |
| 4,710,850 A | 12/1987 | Jahn et al. | |
| 4,821,138 A | 4/1989 | Nakano et al. | |
| 4,903,927 A | 2/1990 | Farmer | |
| 5,006,846 A | 4/1991 | Granville et al. | |
| 5,023,768 A | 6/1991 | Collier | |
| 5,032,738 A | 7/1991 | Vithayathil | |
| 5,193,774 A | 3/1993 | Rogers | |
| 5,461,300 A | 10/1995 | Kappenman | |
| 5,469,044 A | 11/1995 | Gyugyi et al. | |
| 5,610,501 A | 3/1997 | Nelson et al. | |
| 5,648,888 A | 7/1997 | Le Francois et al. | |
| 5,844,462 A | 12/1998 | Rapoport et al. | |
| 5,884,886 A | 3/1999 | Hageli | |
| 5,886,888 A | 3/1999 | Akamatsu et al. | |
| 5,986,617 A | 11/1999 | McLellan | |
| 6,088,249 A | 7/2000 | Adamson | |
| 6,134,105 A | 10/2000 | Lueker | |
| 6,147,581 A | 11/2000 | Rancourt et al. | |
| 6,215,653 B1 | 4/2001 | Cochran et al. | |
| 6,233,137 B1 | 5/2001 | Kolos et al. | |
| 6,335,613 B1 | 1/2002 | Sen et al. | |
| 6,486,569 B2 | 11/2002 | Couture | |
| 6,727,604 B2 | 4/2004 | Couture | |
| 6,831,377 B2 | 12/2004 | Yampolsky et al. | |
| 6,895,373 B2 | 5/2005 | Garcia et al. | |
| 6,914,195 B2 | 7/2005 | Archambault et al. | |
| 7,090,176 B2 | 8/2006 | Chavot et al. | |
| 7,091,703 B2 | 8/2006 | Folts et al. | |
| 7,105,952 B2 | 9/2006 | Divan et al. | |
| 7,193,338 B2 | 3/2007 | Ghali | |
| 7,352,564 B2 | 4/2008 | Courtney | |
| 7,460,931 B2 | 12/2008 | Jacobson | |
| 7,642,757 B2 | 1/2010 | Yoon et al. | |
| 7,688,043 B2 | 3/2010 | Toki et al. | |
| 7,834,736 B1 | 11/2010 | Johnson et al. | |
| 7,835,128 B2 | 11/2010 | Divan et al. | |
| 7,932,621 B1 | 4/2011 | Spellman | |
| 8,019,484 B2 | 9/2011 | Korba et al. | |
| 8,249,836 B2 | 8/2012 | Yoon et al. | |
| 8,270,558 B2 | 9/2012 | Dielissen | |
| 8,310,099 B2 | 11/2012 | Engel et al. | |
| 8,401,709 B2 | 3/2013 | Cherian et al. | |
| 8,441,778 B1 | 5/2013 | Ashmore | |
| 8,497,592 B1 | 7/2013 | Jones | |
| 8,680,720 B2 | 3/2014 | Schauder et al. | |
| 8,681,479 B2 | 3/2014 | Englert et al. | |
| 8,816,527 B1 | 8/2014 | Ramsay et al. | |
| 8,825,218 B2 | 9/2014 | Cherian et al. | |
| 8,867,244 B2 | 10/2014 | Trainer et al. | |
| 8,872,366 B2 | 10/2014 | Campion et al. | |
| 8,890,373 B2 | 11/2014 | Savolainen et al. | |
| 8,896,988 B2 | 11/2014 | Subbaiahthever et al. | |
| 8,922,038 B2 | 12/2014 | Bywaters et al. | |
| 8,957,752 B2 | 2/2015 | Sharma et al. | |
| 8,996,183 B2 | 3/2015 | Forbes, Jr. | |
| 9,099,893 B2 | 8/2015 | Schmiegel et al. | |
| 9,124,100 B2 | 9/2015 | Ukai et al. | |
| 9,124,138 B2 | 9/2015 | Mori et al. | |
| 9,130,458 B2 | 9/2015 | Crookes et al. | |
| 9,172,246 B2 | 10/2015 | Ramsay et al. | |
| 9,178,456 B2 | 11/2015 | Smith et al. | |
| 9,185,000 B2 | 11/2015 | Mabilleau et al. | |
| 9,207,698 B2 | 12/2015 | Forbes, Jr. | |
| 9,217,762 B2 | 12/2015 | Kreikebaum et al. | |
| 9,246,325 B2 | 1/2016 | Coca Figuerola et al. | |
| 9,325,173 B2 | 4/2016 | Varma et al. | |
| 9,331,482 B2 | 5/2016 | Huang | |
| 9,659,114 B2 | 5/2017 | He et al. | |
| 9,843,176 B2 | 12/2017 | Gibson et al. | |
| 2002/0005668 A1 | 1/2002 | Couture | |
| 2002/0042696 A1 | 4/2002 | Garcia et al. | |
| 2003/0006652 A1 | 1/2003 | Couture | |
| 2003/0098768 A1 | 5/2003 | Hoffmann et al. | |
| 2004/0217836 A1 | 11/2004 | Archambault et al. | |
| 2005/0052801 A1 | 3/2005 | Ghali | |
| 2005/0073200 A1 | 4/2005 | Divan et al. | |
| 2005/0194944 A1 | 9/2005 | Folts et al. | |
| 2005/0205726 A1 | 9/2005 | Chavot et al. | |
| 2006/0085097 A1 | 4/2006 | Courtney | |
| 2007/0135972 A1 | 6/2007 | Jacobson | |
| 2007/0250217 A1 | 10/2007 | Yoon et al. | |
| 2008/0103737 A1 | 5/2008 | Yoon et al. | |
| 2008/0157728 A1 | 7/2008 | Toki et al. | |
| 2008/0177425 A1 | 7/2008 | Korba et al. | |
| 2008/0278976 A1 * | 11/2008 | Schneider | H02J 3/1814 363/37 |
| 2008/0310069 A1 | 12/2008 | Divan et al. | |
| 2009/0243876 A1 | 10/2009 | Lilien et al. | |
| 2009/0281679 A1 | 11/2009 | Taft et al. | |
| 2010/0026275 A1 | 2/2010 | Walton | |
| 2010/0177450 A1 | 7/2010 | Holcomb et al. | |
| 2010/0213765 A1 | 8/2010 | Engel et al. | |
| 2010/0302744 A1 | 12/2010 | Englert et al. | |
| 2011/0060474 A1 | 3/2011 | Schmiegel et al. | |
| 2011/0095162 A1 | 4/2011 | Parduhn et al. | |
| 2011/0106321 A1 | 5/2011 | Cherian et al. | |
| 2011/0172837 A1 | 7/2011 | Forbes, Jr. | |
| 2012/0105023 A1 | 5/2012 | Schauder et al. | |
| 2012/0146335 A1 | 6/2012 | Bywaters et al. | |
| 2012/0205981 A1 | 8/2012 | Varma et al. | |
| 2012/0242150 A1 | 9/2012 | Ukai et al. | |
| 2012/0255920 A1 | 10/2012 | Shaw et al. | |
| 2012/0293920 A1 | 11/2012 | Subbaiahthever et al. | |
| 2013/0002032 A1 | 1/2013 | Mori et al. | |
| 2013/0033103 A1 | 2/2013 | McJunkin et al. | |
| 2013/0044407 A1 | 2/2013 | Byeon et al. | |
| 2013/0094264 A1 | 4/2013 | Crookes et al. | |
| 2013/0128636 A1 | 5/2013 | Trainer et al. | |
| 2013/0166085 A1 | 6/2013 | Cherian et al. | |
| 2013/0169044 A1 | 7/2013 | Stinessen et al. | |
| 2013/0182355 A1 | 7/2013 | Coca Figuerola et al. | |
| 2013/0184894 A1 | 7/2013 | Sakuma et al. | |
| 2013/0200617 A1 | 8/2013 | Smith et al. | |
| 2013/0249321 A1 | 9/2013 | Gao et al. | |
| 2013/0277082 A1 | 10/2013 | Hyde et al. | |
| 2013/0345888 A1 | 12/2013 | Forbes, Jr. | |
| 2014/0025217 A1 | 1/2014 | Jin et al. | |
| 2014/0032000 A1 | 1/2014 | Chandrashekhara et al. | |
| 2014/0111297 A1 * | 4/2014 | Earhart | H01F 27/25 336/212 |
| 2014/0129195 A1 | 5/2014 | He et al. | |
| 2014/0132229 A1 | 5/2014 | Huang | |
| 2014/0153383 A1 | 6/2014 | Mabilleau et al. | |
| 2014/0188689 A1 | 7/2014 | Kalsi et al. | |
| 2014/0203640 A1 | 7/2014 | Stinessen | |
| 2014/0210213 A1 | 7/2014 | Campion et al. | |
| 2014/0246914 A1 | 9/2014 | Chopra et al. | |
| 2014/0247554 A1 | 9/2014 | Sharma et al. | |
| 2014/0268458 A1 | 9/2014 | Luciani et al. | |

(56) References Cited

U.S. PATENT DOCUMENTS

| | | | |
|---|---|---|---|
| 2014/0312859 | A1 | 10/2014 | Ramsay et al. |
| 2014/0327305 | A1 | 11/2014 | Ramsay et al. |
| 2014/0347158 | A1 | 11/2014 | Goeke et al. |
| 2015/0012146 | A1 | 1/2015 | Cherian et al. |
| 2015/0029764 | A1 | 1/2015 | Peng |
| 2015/0051744 | A1 | 2/2015 | Mitra |
| 2015/0184415 | A1 | 7/2015 | Bushore |
| 2015/0226772 | A1* | 8/2015 | Kreikebaum ........ G01R 15/202 324/244 |
| 2015/0244307 | A1 | 8/2015 | Cameron |
| 2015/0270689 | A1 | 9/2015 | Gibson et al. |
| 2016/0036231 | A1 | 2/2016 | Ramsay et al. |
| 2016/0036341 | A1 | 2/2016 | Jang et al. |
| 2017/0163036 | A1 | 6/2017 | Munguia et al. |
| 2017/0169928 | A1 | 6/2017 | Carrow et al. |

FOREIGN PATENT DOCUMENTS

| | | | |
|---|---|---|---|
| CN | 203668968 | 6/2014 | |
| GB | 1141390 A * | 1/1969 | ............... H02G 7/16 |
| JP | 2002-199563 | 7/2002 | |
| JP | 2005-045888 | 2/2005 | |
| JP | 2015-086692 | 5/2015 | |
| KR | 10-1053514 | 8/2011 | |
| WO | WO-2008/082820 | 7/2008 | |
| WO | WO-2014/035881 | 3/2014 | |
| WO | WO-2014/074956 | 5/2014 | |
| WO | WO-2014/099876 | 6/2014 | |
| WO | WO-2015/074538 | 5/2015 | |
| WO | WO-2015/119789 | 8/2015 | |

OTHER PUBLICATIONS

"International Search Report and Written Opinion of the International Searching Authority dated Feb. 2, 2017; International Application No. PCT/US2016/062620", (dated Feb. 2, 2017).

"International Search Report and Written Opinion of the International Searching Authority dated Mar. 2, 2017; International Application No. PCT/US2016/061009", (dated Mar. 2, 2017).

"Invitation of the International Searching Authority to Pay Additional Fees dated Dec. 15, 2016; International Application No. PCT/US2016/061009", (Dec. 15, 2016).

Amin, S. M., et al., "Toward a Smart Grid: Power Delivery for the 21st Century", *IEEE power & energy magazine*, vol. 3, No. 5, (Sep./Oct. 2005), pp. 34-41.

Angeladas, Emmanouil , "High Voltage Substations Overview (part 1)", *Siemens*, (Jan. 24, 2013), pp. 1-8.

Aquino-Lugo, Angel A., "Distributed and Decentralized Control of the Power Grid", *Ph.D. Dissertation, University of Illinois at Urbana-Champaign*, (2010), 172 pp. total.

Dash, P. K., et al., "Digital Protection of Power Transmission Lines in the Presence of Series Connected FACTS Devices", *IEEE Power Engineering Society Winter Meeting*, (2000), pp. 1967-1972.

Divan, D. M., "Nondissipative Switched Networks for High-Power Applications", *Electronics Letters*, vol. 20, No. 7, (Mar. 29, 1984), pp. 277-279.

Funato, Hirohito , et al., "Realization of Negative Inductance Using Variable Active-Passive Reactance (VAPAR)", *IEEE Transactions on Power Electronics*, vol. 12, No. 4, (Jul. 1997), pp. 589-596.

Gyugyi, Laszlo , et al., "Status Synchronous Series Compensator: A Solid-State Approach to the Series Compensation of Transmission Lines", *IEEE Transactions on Power Delivery*, vol. 12, No. 1, (Jan. 1997), pp. 406-417.

Gyugyi, Laszlo , et al., "The Interline Power Flow Controller Concept: A New Approach to Power Flow Management in Transmission Systems", *IEEE Transactions on Power Delivery*, vol. 14, No. 3, (Jul. 1999), pp. 1115-1123.

Kavitha, M. , et al., "Integration of FACTS into Energy Storage Systems for Future Power Systems Applications", *International Journal of Advanced Research in Electrical, Electronics and Instrumentation Engineering*, vol. 2, Issue 2, (Feb. 2013), pp. 800-810.

Kumbhar, Mahesh M., et al., "Smart Grid: Advanced Electricity Distribution Network", *IOSR Journal of Engineering (IOSRJEN)*, vol. 2, Issue 6, (Jun. 2012), pp. 23-29.

Lambert, Frank C., "Power Flow Control", *ISGT Europe*, 2014, Istanbul, Turkey, (Oct. 13, 2014), pp. 1-15.

Lehmkoster, Carsten , "Security Constrained Optimal Power Flow for an Economical Operation of FACTS-Devices in Liberalized Energy Markets", *IEEE Transactions on Power Delivery*, vol. 17, No. 2, (Apr. 2002), pp. 603-608.

Mali, Bhairavanath N., et al., "Performance Study of Transmission Line Ferranti Effect and Fault Simulation Model Using MATLAB", *International Journal of Innovative Research in Electrical, Electronics, Instrumentation and Control Engineering*, vol. 4, Issue 4, (Apr. 2016), pp. 49-52.

Mutale, Joseph , et al., "Transmission Network Reinforcement Versus FACTS: An Economic Assessment", *IEEE Transactions on Power Systems*, vol. 15, No. 3, (Aug. 2000), pp. 961-967.

Ramchurn, Sarvapali D., et al., "Putting the 'Smarts' into the Smart Grid: A Grand Challenge for Artificial Intelligence", *Communications of the ACM*, vol. 55, No. 4, (Apr. 2012), pp. 86-97.

Reddy, D. M., et al., "FACTS Controllers Implementation in Energy Storage Systems for Advanced Power Electronic Applications—A Solution", *American Journal of Sustainable Cities and Society*, Issue 2, vol. 1, (Jan. 2013), pp. 36-63.

Renz, B. A., et al., "AEP Unified Power Flow Controller Performance", *IEEE Transactions on Power Delivery*, vol. 14, No. 4, (Oct. 1999), pp. 1374-1381.

Ribeiro, P. , et al., "Energy Storage Systems", Chapters 1-2.4 of Section entitled "Energy Storage Systems" in Electrical Engineering—vol. III, edited by Kit Po Wong, Encyclopedia of Life Support Systems (EOLSS) Publications, (Dec. 13, 2009), 11 pp. total.

Schauder, C. D., et al., "Operation of the Unified Power Flow Controller (UPFC) Under Practical Constraints", *IEEE Transactions on Power Delivery*, vol. 13, No. 2, (Apr. 1998), pp. 630-639.

Siemens SAS, "Portable Power Solutions, "Plug and play" High Voltage E-Houses, skids and mobile high voltage substations up to 420 kV", (Nov. 2015), 8 pp. total.

Swain, S. C., et al., "Design of Static Synchronous Series Compensator Based Damping Controller Employing Real Coded Genetic Algorithm", *International Journal of Electrical, Computer, Energetic, Electronic and Communication Engineering*, vol. 5, No. 3, (2011), pp. 399-407.

Xue, Yiyan , et al., "Charging Current in Long Lines and High-Voltage Cables—Protection Application Considerations", *67th Annual Georgia Tech Protective Relaying Conference*, Atlanta, Georgia, (May 8-10, 2013), pp. 1-17.

"Notice of Allowance dated Feb. 22, 2018; U.S. Appl. No. 15/069,785", dated Feb. 22, 2018.

"Office Action dated Apr. 6, 2018; U.S. Appl. No. 15/055,422", dated Apr. 6, 2018.

"Office Action dated Feb. 9, 2018; U.S. Appl. No. 15/345,065", dated Feb. 9, 2018.

"Office Action dated Jul. 27, 2018; U.S. Appl. No. 15/055,422", dated Jul. 27, 2018.

Albasri, Fadhel A. et al., "Performance Comparison of Distance Protection Schemes for Shung-FACTS Compensated Transmission Lines", IEEE Transactions on Power Delivery, vol. 22, No. 4, Oct. 2007, pp. 2116-2125.

Bhaskar, M. A. et al., "Impact of FACTS devices on distance protection in Transmission System", 2014 IEEE National Conference on Emerging Trends in New & Renewable Energy Sources and Energy Management (NCET NRES EM), Dec. 16, 2014, pp. 52-58.

Samantaray, S. R., "A Data-Mining Model for Protection of FACTS-Based Transmission Line", IEEE Transactions on Power Delivery, vol. 28, No. 2, Apr. 2013, pp. 612-618.

"Office Action dated Jul. 26, 2017; U.S. Appl. No. 15/069,785", (dated Jul. 26, 2017).

"Notice of Allowance dated Sep. 4, 2018; U.S. Appl. No. 15/345,065", dated Sep. 4, 2018.

(56) References Cited

OTHER PUBLICATIONS

"Office Action dated Oct. 4, 2018; U.S. Appl. No. 15/975,373", dated Oct. 4, 2018.

* cited by examiner

Figure 3:
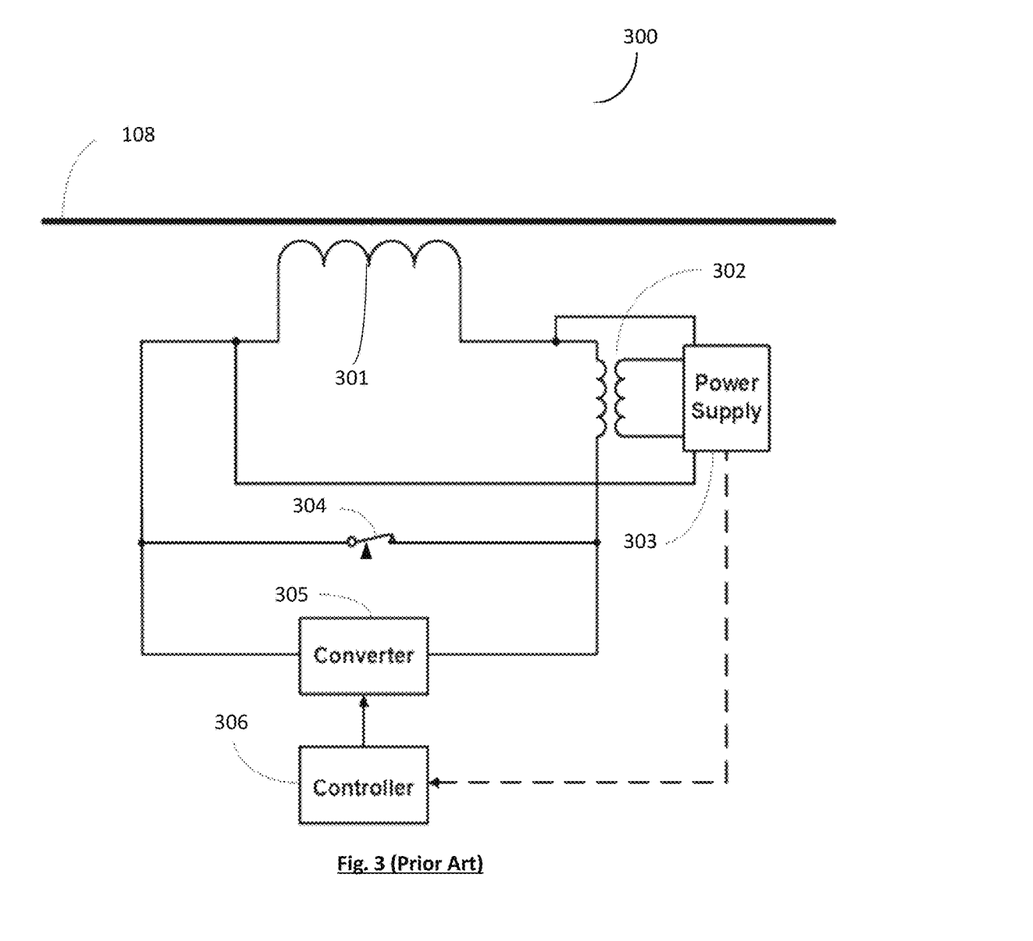
FIG. 3 is an exemplary block diagram 300 of an active impedance injection module, licensed to the current entity, using a single turn transformer for distributed active impedance injection on to a HV transmission line (Prior Art).

POWER TRANSMISSION TOWER MOUNTED SERIES INJECTION TRANSFORMER

CROSS-REFERENCE TO RELATED APPLICATIONS

This application claims the benefit of U.S. Provisional Patent Application No. 62/265,626 filed Dec. 10, 2015.

BACKGROUND OF THE INVENTION

1. Field of the Invention

The present invention relates to systems and methods for distributed control of the inductance and capacitive loading of high-voltage power lines and specifically relates to such systems using an injection transformer mounted on a transmission tower.

2. Prior Art

One of the requirements of improving the efficiency of the power grid is the removal of transmission bottlenecks related to active power flow control. The need is to control where and how the real power flow is achieved on the grid. Congested networks limit the system reliability and increase the cost of power delivery across the power grid. To improve the power flow through-put of the grid, it is necessary to be able to adjust the power flowing along any of the wires. Unbalanced lines produce uncontrolled loop currents, overloading the lines with increased losses. Active power flow control provides the best solution for this problem by altering the line impedances and changing the angle of the voltage on the respective line, thereby controlling power flow. Active power flow control using impedance injection (both capacitive and inductive) with centralized control at network level has been proposed in the past but the complexity and cost of such systems have prevented implementation. Most of the grid control capabilities by injecting impedance are still ground based, installed at substations with switch-able inductive and capacitive loads that have the associated requirement for high-voltage insulation and high-current switching capabilities. Being at the substations, they are able to use cooling methods that include oil cooling etc. with less weight limitations and less limitations of the profile of the units used. There is consensus that future power grids will need to be smart and aware, fault tolerant and self-healing, dynamically and statically controllable, and asset and energy efficient. It has also been understood that distributed active impedance injection units that are intelligent and self aware will be able provide the needed distributed control of the line impedance if such can be effectively implemented with high reliability. Such a system implementation can provide the solution to this dilemma and improve the system power grid efficiency substantially.

At present there are few solutions for distributed control of the power grid, which have been proven effective and reliable. One such system is the Power Line Guardian™ commercial product from the assignee of the current application. FIG. 1 shows the block schematic 102 of the current static distributed control capability. These static distributed control modules 110 and 100 are directly attached to high-voltage-transmission line segments 108 to provide distributed control of the transmitted power from the generator 104 to the distribution stations 106. These solutions provide a limited amount of control success by adding inductive load to the lines by switching the inductance load in and out of circuit, and are described in U.S. Pat. No. 7,105,952 and U.S. Pat. No. 7,835,128 currently licensed to the assignee of the current application. PCT Publication No. WO2014/099876, owned by the assignee of the current application, discusses the physical installation on the power line.

The distributed module 100 is a distributed series reactor (DSR) that impresses a static inductive load using a transformer with a single turn primary winding (the HV-line section) with a single multi-turn secondary winding by having a pre-defined inductance switched on and off to impress the inductance on the HV-transmission line. The DSR 100 allows a passive, switch-able distributed inductance to be gradually inserted into a conductor 108, thus effectively increasing the line impedance and causing current to direct into other lines that have additional capacity. A distributed series impedance device such as the DSR 100 is clamped around the conductor 108 using a single turn transformer (STT).

FIGS. 2 and 2A and 2B show embodiments of a passive impedance injection module DSR 100. The HV transmission line 108 is incorporated into the module as the primary winding by adding two split-core sections 132 that are assembled around the HV transmission line 108. The core sections 132 are attached to the HV transmission line 108 with an air gap 138 separating the sections after assembly. The air gap 138 is used to set a maximum value of fixed inductive impedance that is to be injected on the HV line via the primary winding. Secondary winding 134 and 136 encircles the two split-core sections 132 and enabled the bypass switch 122 to short out the secondary winding and prevent injection of inductive impedance on to the a HV transmission line 108 and also provide protection to the secondary circuits when power surges occur on the HV transmission line. The split core sections 132 and the windings 134 and 136 comprise the single-turn transformer (STT) 120. A power supply module 128 derives power from the secondary windings 134&136 of the STT 120 via a series connected transformer 126. The power supply 128 provides power to a controller 130. The controller 130 monitors the line current via the secondary current of the STT 120, and turns the bypass switch 122 off when the line current reaches and exceeds a predetermined level. With the contact switch 122 open, a thyristor 124 may be used to control the injected inductive impedance to a value up to the maximum set by the air gap 138 of DSR 100.

Distributed active impedance injection modules on high voltage transmission lines have been proposed in the past. U.S. Pat. No. 7,105,952 of Divan et al. licensed to the applicant entity is an example of such. FIG. 3 shows an exemplary schematic of an active distributed impedance injection module 300. These modules 300 are expected to be installed in the same location on the HV power line as the passive impedance injection modules (or "DSR" 100) shown FIG. 1. The active impedance injection module 300 does not perform the same functions. In fact the active impedance injection module 300 does not have a gapped core 132 of FIG. 2B that provides the fixed inductive impedance. Instead the inductive or capacitive impedance is generated using the converter 305 based on the sensed HV transmission line 108 current. Sampling the secondary current by the series-connected secondary transformer 302 does the sensing of the magnitude of the line current. The sensing and power supply block 303 connected to the secondary transformer 302 extracts the HV transmission line current information and feeds the controller 306. The controller based on the received input provides the necessary commands to the converter 305 to generate the required inductive or capacitive impedance to adjust the line impedance. The value of the impedance in this case is not fixed but varies according to the status of the measured current on the HV transmission line. Hence the system using spatially distributed active impedance injection modules 300 provides for a much smoother and efficient method for balancing the grid.

In practice the active impedance injection modules 300s have not been practical due to reasons of cost and reliability. In order to inject the needed impedances on to the HV transmission line for providing reasonable line balancing there is a need to generate a significant amount of power in the converter circuits. This has required the active impedance injection modules 300 to use specialized devices with adequate voltages and currents ratings.

Figure 1:
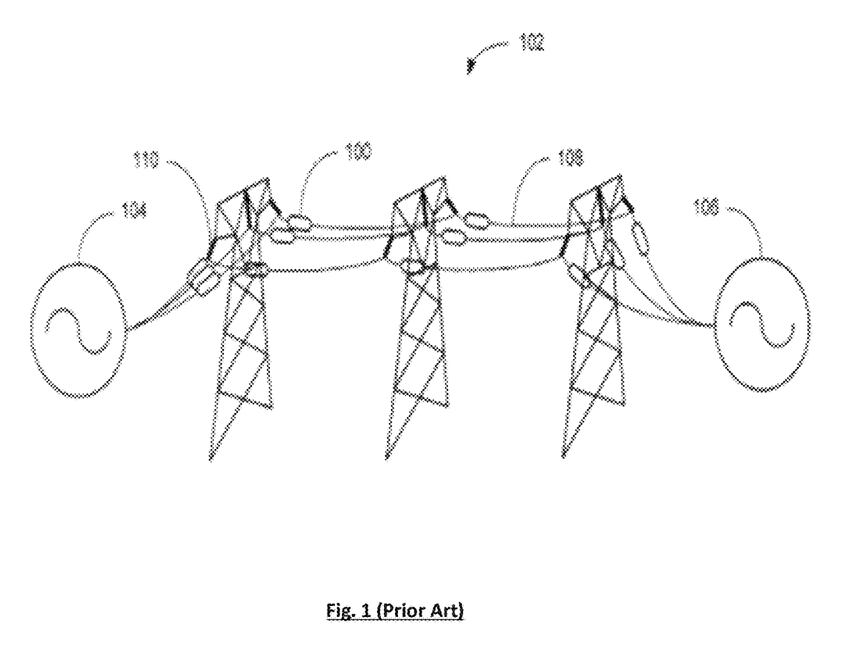
FIG. 1 is a block diagram of a grid section showing distributed static control modules attached directly to the HV-transmission-lines (Prior Art).
Figure 2:
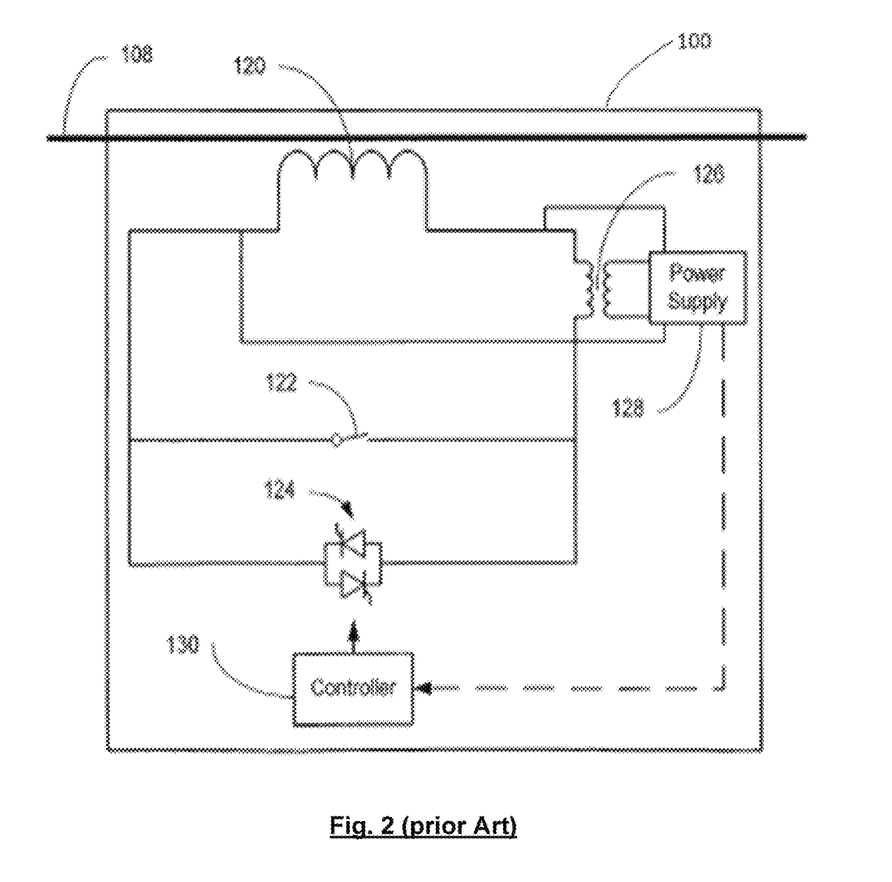
FIG. 2 is an exemplary block diagram of an inductive impedance injection module using a single turn transformer for distributed inductive impedance injection on a HV-transmission-line (Prior art).
Figure 2A:
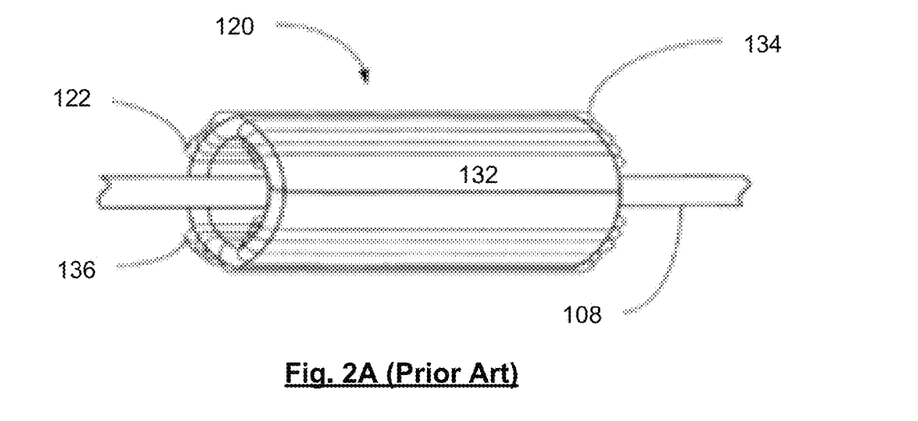
FIGS. 2A and 2B are exemplary schematics of the single turn transformer used in the passive impedance injection module of FIG. 2 (Prior Art).
Figure 2B:
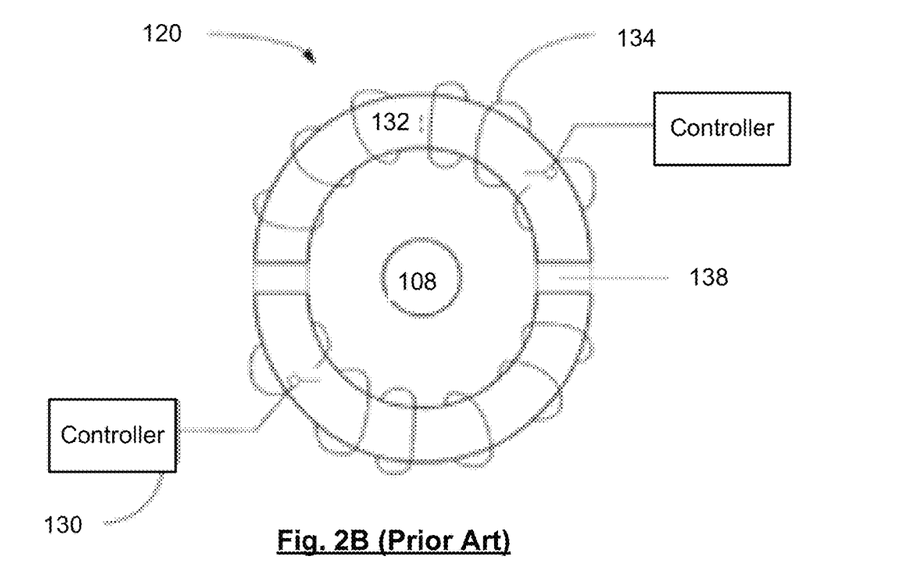

The failure of a module in a spatially distributed inductive impedance injection line balancing system using DSR 100 modules inserts a fixed inductive impedance set by the "air gap" 138 or substantially zero impedance on to the line. Failure of a few modules out of a large number distributed over the HV transmission line does not mandate the immediate shutdown of the line. The repairs or replacement of the failed modules can be undertaken at a time when the line can be brought down with minimum impact on the power flow on the grid. For utilities to implement distributed active line balancing, the individual modules must be extremely reliable. They also have to be cost effective to be accepted by the Utilities.

Power transmission line balancing circuits have been limited to the use of delayed-acting heavy-duty fully-insulated oil-cooled inductive and capacitive impedance injectors or phase-shifting transformers prone to single-point failures, located at substations where repairs of these failed units can be handled with out major impact on power transfer over the grid.

A STT clamped to the HV-transmission line has limited influence on the power flow. A multi-turn transformer (MTT) would have many times the influence of the STT but requires cutting the HV-transmission line to install. The HV-transmission line typically hangs from a suspension tower which applies a vertical force to support the weight of the HV-transmission line. The HV-transmission line has significant horizontal tension and a break in the HV-transmission line can exert sufficient force to cause the suspension towers to topple over. Installing, maintaining and replacing a MTT that connects to the two ends of a cut in the HV-transmission line would be difficult, expensive and potentially dangerous. A STT clamped to the HV-transmission line has a weight limitation that inhibits its influence. The influence of a transformer depends on the weight of the transformer. The clamped STT must be light enough to avoid adding excessive tension to HV-transmission line and needs to be stable in extreme weather conditions such as high winds.

The HV-power grids would benefit significantly if the distributed series reactors could exert greater influence by, for example, using transformers with more weight.

BRIEF DESCRIPTION OF THE DRAWINGS

The drawings are made to point out and distinguish the invention from the prior art. The objects, features and advantages of the invention are detailed in the description taken together with the drawings.

DETAILED DESCRIPTION OF THE PREFERRED EMBODIMENTS

The power transmission tower mounted series injection transformer/module (TMIT) injects impedance and/or voltage on a transmission tower power line to control and regulate power flow. In contrast to the prior solution of clamping the injection transformer to the HV transmission line, the TMIT is supported from a tension bearing tower using vertical and horizontal insulators. The TMIT can be much heavier than a transformer device clamped to the high-voltage (HV) transmission line; for example 1000 lb instead of 200 lb. A heavier transformer generally supports a higher voltage-injection capability as well as a higher current capability. The TMIT is normally connected in series with the tension-bearing tower's jumper allowing it to use a multi-turn transformer. The TMIT has much greater influence on the HV-transmission line; for example it may inject 100 to 400 volts compared to 10 volts for the prior art solution. By operating at the line voltage potential, the TMIT does not require the large bushings and oil drums used by sub-station injection transformers.

Figure 4:
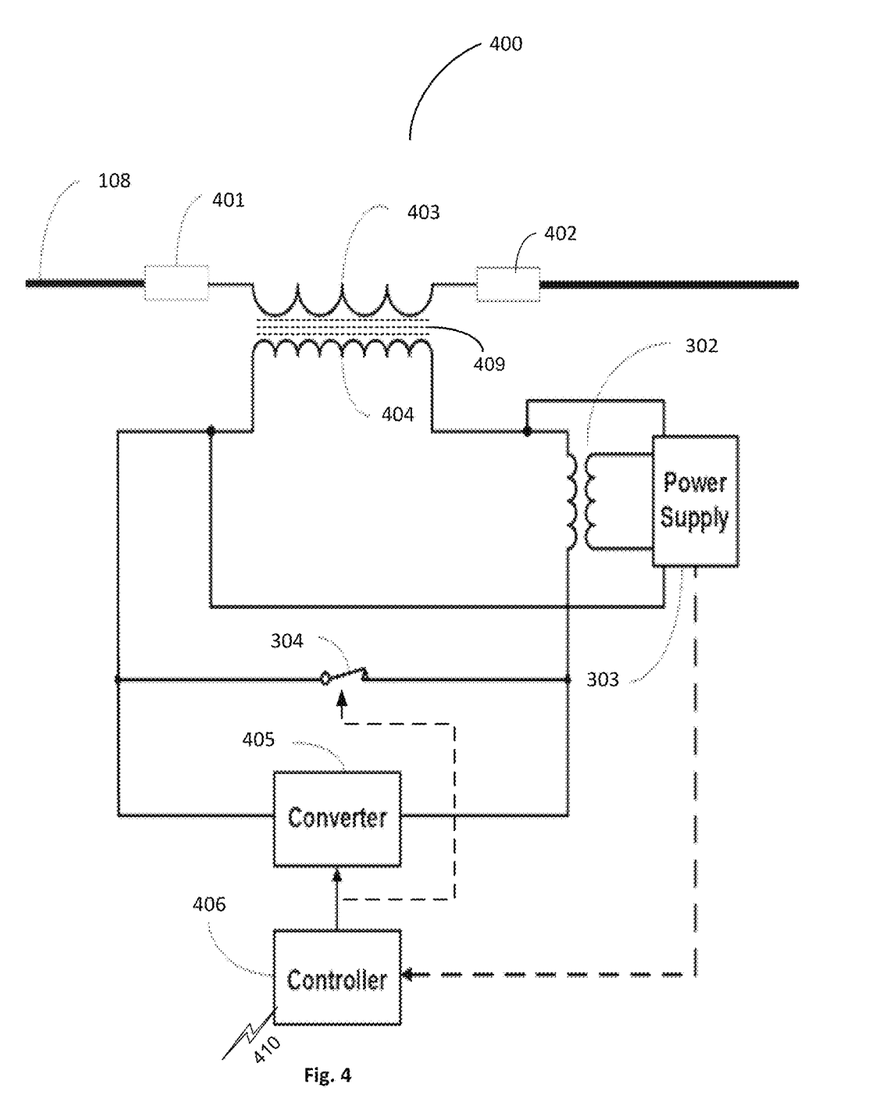
FIG. 4 is an exemplary block diagram 400 of an embodiment of the disclosed active impedance injection module using multi-turn primary windings for distributed active impedance injection on a HV transmission line.

The current invention addresses the advantages and features of the distributed injection transformers/modules with enhanced support to allow use of larger and heavier distributed injection transformers/modules for the associated enhanced injection capabilities, thereby enhancing the total injection capability and/or reducing the total number of distributed injection transformers/modules needed. FIG. 4 illustrates an exemplary module, wherein the voltage converter or simply converter may be of any appropriate design, as such devices of various designs are well known in the art. Typically such devices are configured to inject an inductive load onto the high voltage transmission line, and may also have the capability of injecting a capacitive load on the transmission line for power factor control, and may further be capable of controlling harmonic content in the high voltage transmission line. Such devices are also known by other names, such as by way of example, inverters or converters/inverters. An exemplary device of this general type is the combination of the inverter 71 and energy storage 74 of U.S. Pat. No. 7,105,952, though many other examples of such devices are well known. These devices typically act as active impedances to controllably impose the desired impedance onto the high voltage transmission line. Also preferably the controller used in the preferred embodiments includes a transceiver for receiving control signals and reporting on high voltage transmission line conditions, etc.

Figure 3A:
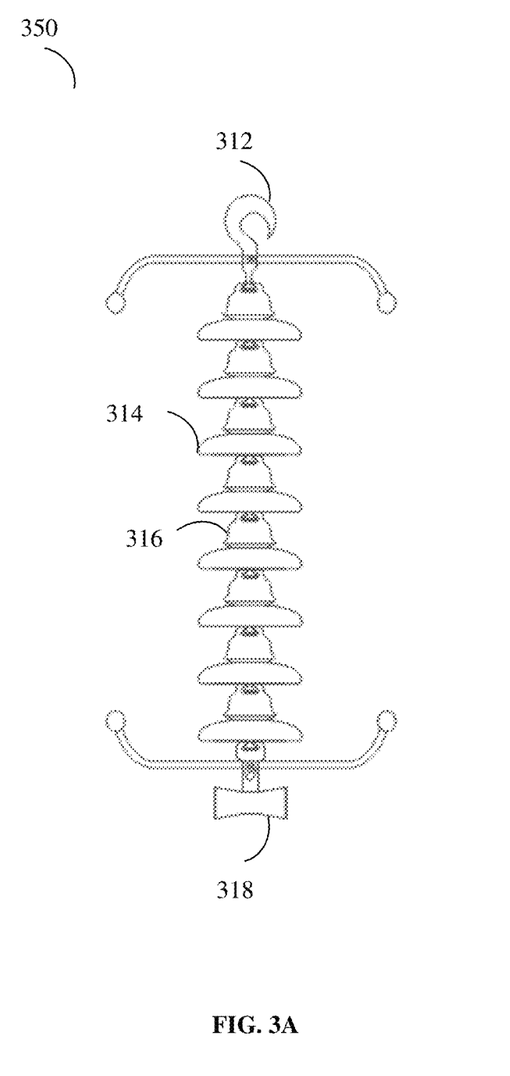
FIG. 3A shows a typical suspension insulator (Prior Art).

HV-transmission lines for high voltage power distribution systems are most commonly suspended from a type of tower called a suspension tower. The suspension tower supports the weight of the HV-transmission line using a suspension insulator. FIG. 3A shows a typical suspension insulator 350. The suspension insulator 350 hangs from a tower with connector 312 and the line conductor 108 is suspended from connector 318. The suspension insulator 350 typically consists of a series of ceramic disc insulators 314 and rubber grommets 316.

When a suspension insulator is used to sustain extraordinary tensile conductor loads it is referred to as a strain insulator. When there is a dead end or there is a sharp corner in transmission line, the line has to sustain a great tensile load of conductor or strain. A strain insulator must have considerable mechanical strength as well as the necessary electrical insulating properties.

A dead-end tower (also known as an anchor tower or anchor pylon) is a fully self-supporting structure used in construction of overhead transmission lines. A dead-end tower uses horizontal strain insulators where the conductors mechanically terminate. Dead-end towers may be used at a substation as a transition to a "slack span" entering the equipment, when the circuit changes to a buried cable, when a transmission line changes direction by more than a few degrees, or just once in a while to limit the extent of a catastrophic collapse. Since dead-end towers require more material and are heavier and costlier than suspension towers, it is uneconomic to build a line with only self-supporting structures.

Dead-end towers are used at regular intervals in a long transmission line to limit the cascading tower failures that might occur after a conductor failure. An in-line dead-end tower will have two sets of strain insulators supporting the lines in either direction, with the lines connected by a jumper between the two segments. Dead-end towers can resist unbalanced forces due to line weight and tension, contrasted with suspension towers which mostly just support the conductor weight and have relatively low capacity for unbalanced load. A dead-end construction tower is another example of a tension-bearing tower that uses strain insulators and a jumper.

Figure 3B:
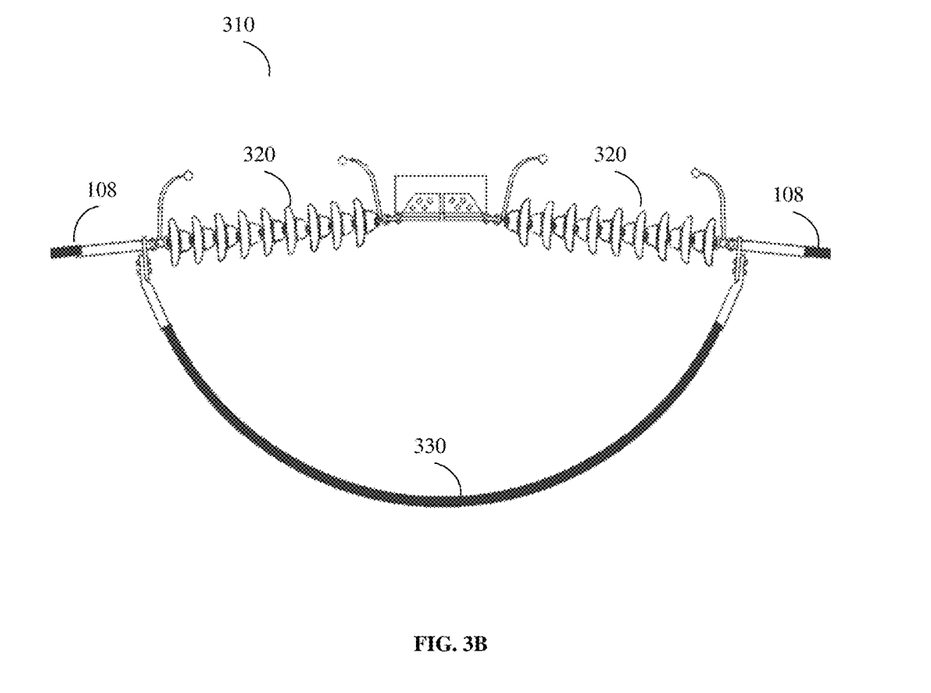
FIG. 3B shows a typical strain insulator (Prior Art).

FIG. 3B is a diagram 310 showing typical strain insulators 320. Each strain insulator 320 supports the mechanical weight and horizontal tension of a HV-transmission line 108. The jumper 330 electrically connects the HV-transmissions lines 108 coming from adjacent towers or sub-stations. Unlike the HV-transmission line 108, the jumper 330 has negligible tension.

Figure 4A:
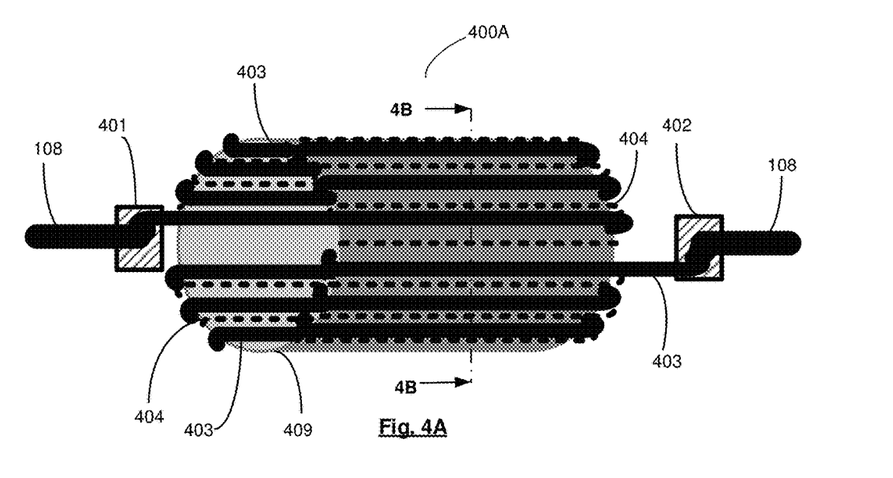
FIG. 4A is an exemplary schematic of a multi-turn primary transformer as per an embodiment of the current invention.

FIG. 4 is an exemplary block diagram 400 of an implementation of the active impedance injection module (injection module) of the current invention. The injection module 400 comprises a multi-turn transformer 400A that has its primary winding 403 connected directly to the transmission line 108 of a high voltage power distribution system by breaking the line and attaching the two ends of the primary winding 403, and splicing into the line segment as shown in FIG. 4A at 401 and 402. The primary winding 403 is in series with the HV transmission line 108 and carries the total current carried by the transmission line 108. In order to reduce losses due to skin effect in the conductors and thereby reduce the heating of the conductors used in the primary winding, 403 of the multi-turn transformer 400A, ribbon conductor or a braided ribbon conductor may be used, instead of the standard conductor, for the primary winding 403, as shown in the exemplary cross section FIG. 4B of the multi-turn transformer, 400A. The ribbon/braided ribbon conductor when used, also helps to reduce the overall weight of the conductor used and hence reduce the weight of the whole injection module 400. A non-gapped transformer core 409, of high permittivity material, is used to allow the maximum coupling possible between the primary winding 403 and the secondary winding 404 of the multi-turn transformer 400A. In this instance it is essential to have the splicing system design to be made robust to withstand the stresses that the splicing system will be subject to in the event of a utility-level fault current, to minimize the chance that splicing unit 401 and 402 failure will take down the line 108. The secondary winding 404 of the transformer couples to the primary winding 403 and is floating with respect to the primary winding. A virtual ground at the potential of the HV transmission line 108 is established by connecting one side of the secondary winding of the multi-turn transformer to the HV transmission line that enables the injection module 400 itself to be floating at high voltage of the HV transmission line 108 during operation.

A second low voltage transformer 302 in the secondary circuit is connected to a power supply 303 within the injector module 400 that generates the necessary power required for the low voltage electronics comprising the sensing, communication and control circuitry, all of which are lumped in the block diagram of the module as controller 406, the voltage converter 405 and the secondary winding shorting switch 304. The switch is activated to prevent damage to the circuits connected across the secondary winding 404 during occurrence of high transients on the HV-transmission-line due to line short circuit or lightning strikes. The controller 406 has sensor circuitry for monitoring the status of the line and to trigger the protection circuits 304, and communication capability 410 for inter link communication and for accepting external configuration and control commands, which are used to provide additional instructions to the converter 406. The voltage converter 405 is an active voltage converter that, based on input from the controller 406, generates the necessary leading or lagging voltages of sufficient magnitude, to be impressed on the secondary winding 404 of the power line transformer of the distributed active impedance injection module 400, to be coupled to the HV-transmission-line 108 through the series connected multi-turn primary winding 403 of the transformer. This injected voltage at the appropriate phase angle is able to provide the necessary impedance input capability for balancing the power transfer over the grid in a distributed fashion. The multi-turn primary 403 of the disclosed transformer 400A coupled to the HV-transmission line 108 is hence the main enabler for implementing the active distributed control of the power transfer and balancing of the grid.

The current application addresses the advantages and features of the use of multi-turn secondary windings 403 of a distributed active impedance injection module (injector module) 400 attached to the HV-transmission-line 108. By using a multi-turn primary winding 403 the multi-turn transformer 400A is able to impress a higher voltage on the power HV transmission line while the connected circuits of the secondary winding 404 (converter 405, controller 406 and protection switch 304) of the transformer 400A are able to operate at lower voltage ranges, that are typical of power electronic components commercially available. This enables cost-effective manufacture of the module using standard components and devices while providing the needed high reliability to the modules and high reliability to the grid system. The use of this type of injection module 400 allows fast response to changes in loading of the HV transmission lines at or close to the point of change for dynamic control and balancing of the transmission lines. By providing the capability for injection of sufficiently large inductive and capacitive loads in line segments using reliable distributed injector modules 400, the over all system stability is also improved. The injector module 400 of the current invention is not confined to substations, as in the past, but is enabled to provide power flow control capability within existing utility right-of-way corridors in a distributed fashion. The use of multi-turn primary winding 403 also allow the typical use of non-gapped core for the transformer improving the weight and power transfer coupling of the device to the HV-transmission-line 108.

It should be understood that all the associated circuits of the module are enclosed in a housing, which is suspended insulated from ground at the HV transmission line voltage. Due to weight considerations it is preferable to have these modules suspended from the towers or provide additional support for their safe attachment.

Figure 4B:
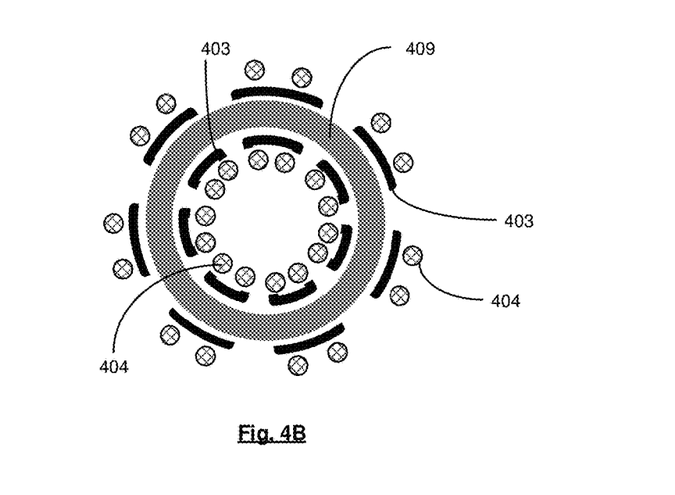
FIG. 4B shows an exemplary cross section of the multi-turn transformer of FIG. 4A.

FIG. 4A is an exemplary diagram showing a multi-turn transformer 400A that has its primary winding 403 connected directly to the transmission line 108 for high voltage power distribution systems by breaking the line and attaching the two ends of the primary winding 403, by splicing into the line segment as shown at 401 and 402. FIG. 4B shows an exemplary cross section of the multi-turn transformer of FIG. 4A. The primary winding 403 is in series with the HV transmission line, 108 and carries the total current carried by the transmission line, 108. A non-gapped transformer core 409, of high permittivity material, is used to allow the maximum coupling possible between the primary winding 403 and the secondary winding 404 of the multi-turn transformer 400A. The secondary winding 404 of the transformer couples to the primary winding 403 and is floating with respect to the primary winding.

Figure 4C:
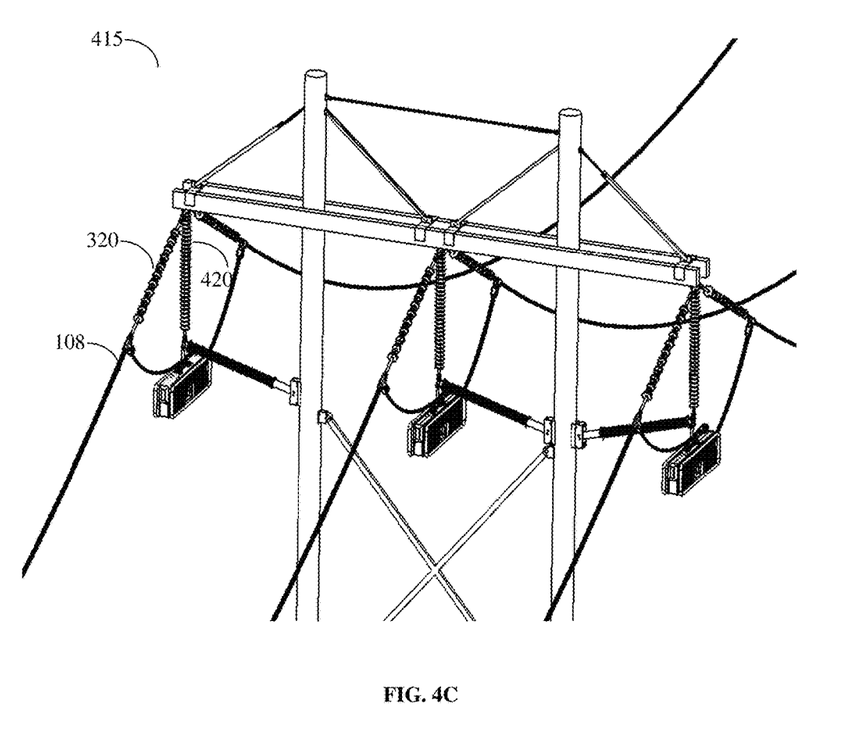
FIG. 4C is an exemplary diagram showing the TMIT connected to a tension-bearing tower.

FIG. 4C is an exemplary diagram 415 showing the TMIT 450 physically connected by suspension insulator 420 and horizontal post insulator 430. The TMIT 450 includes one or more active impedance injection modules 400. The suspension insulator 420 supports the full TMIT's 450 weight. The horizontal post insulator 430 stabilizes the position of the TMIT 450 and prevents or limits high wind movement. The TMIT 450 is electrically connected in series to the jumper 330 which is electrically connected to the HV-transmission line 108. The strain insulators 320 support the full weight and tension of the HV-transmission line 108.

Figure 5:
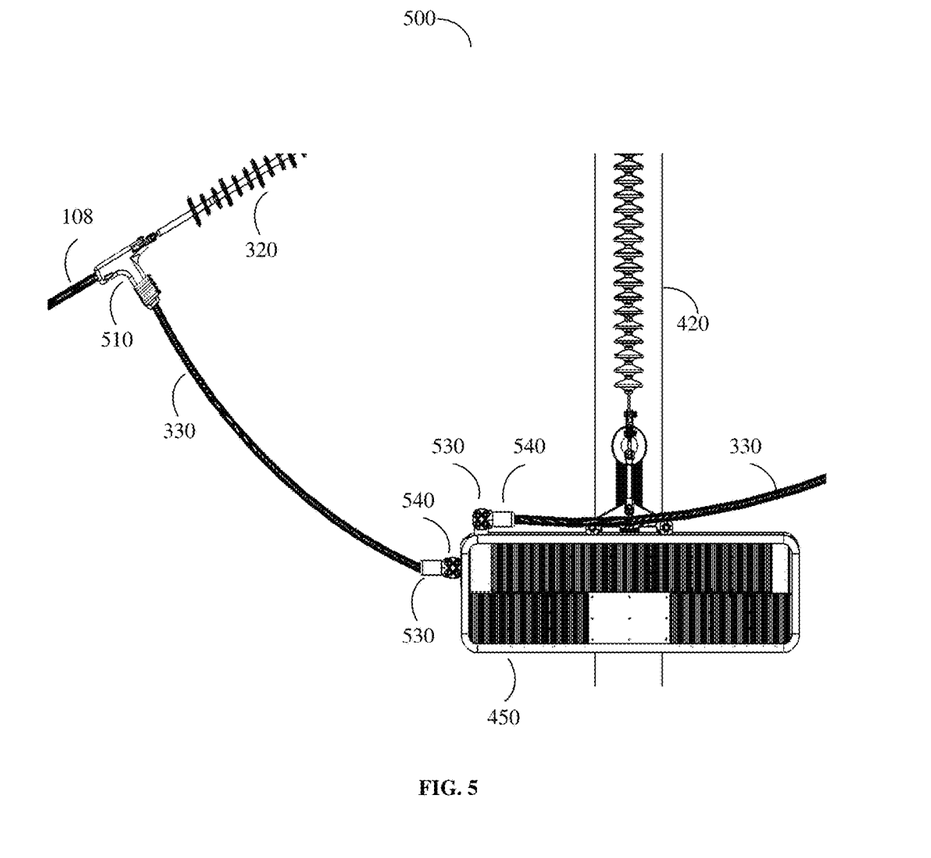
FIG. 5 is an exemplary diagram showing the TMIT connections.

FIG. 5 is an exemplary diagram 500 showing the TMIT 450 connections. A commodity off-the-shelf conductor strain clamp 510 physically connects the HV-transmission line 108, the strain insulator 320 and the jumper 330. The commodity off-the-shelf conductor strain clamp 510 electrically connects the HV-transmission line 108 to the jumper 330. The jumper 330 terminates at a commodity off-the-shelf jumper terminal 530 and electrically connects to the TMIT 450 with a bolted primary connection 540. The suspension insulator 420 supports the TMIT's 450 weight.

One end of the TMIT is called the local ground. The local ground is at the line potential, at high-voltage, typically 200-300 KV. After the TMIT does its work there may be 100 volts difference. The TMIT needs ⅛" of plastic to insulate wires experiencing the 100V potential difference.

In the preferred embodiment the TMIT is connected in series with the jumper. In a second embodiment the TMIT replaces the jumper and connects to the ends of the HV-transmission line.

If there is a long sequence of suspension towers without any tension-bearing towers, the TMIT is installed on a suspension tower converted to a tension-bearing tower. To convert the suspension tower to a tension-bearing tower, strain insulators are attached to the tower, the horizontal strain in the HV-transmission line is temporarily supported, the HV-transmission line is cut and the ends are connected to the strain insulators. The horizontal strain in the HV-transmission line is typically supported by clamping together segments either side of the cut.

Thus the present invention has a number of aspects, which aspects may be practiced alone or in various combinations or sub-combinations, as desired. Also while certain preferred embodiments of the present invention have been disclosed and described herein for purposes of exemplary illustration and not for purposes of limitation, it will be understood by those skilled in the art that various changes in form and detail may be made therein without departing from the spirit and scope of the invention.

What is claimed is:

1. For use in a high voltage power distribution system, apparatus comprising:
a series injection transformer having a multi-turn primary winding having first and second ends;
the series injection transformer being suspended from a tower of the high voltage power distribution system and not by a high voltage line or high voltage line segment of the high voltage power distribution system suspended by the tower;
an end of first and second high voltage line segments being connected to the suspension tower through first and second strain insulators, respectively; and
first and second jumpers, a first end of each of the first and second jumpers being connected to a respective one of the ends of the first and second high voltage line segments;
the second end of each of the first and second jumpers each being connected to a respective end of the multi-turn primary winding.

2. The apparatus of claim 1 wherein the series injection transformer is suspended from a tower of the high voltage power distribution system, the tower being a dead-end tower.

3. The apparatus of claim 2 wherein the dead-end tower comprises a suspension tower that has been converted to a dead-end tower.

4. The apparatus of claim 2 wherein the series injection transformer is suspended from a tower of the high voltage power distribution system by a suspension insulator.

5. The apparatus of claim 2 further comprising a horizontal post insulator coupled to the tower and stabilizing the position of the series injection transformer to prevent or limit high wind movement of the series injection transformer.

6. The apparatus of claim 1 wherein the series injection transformer operates at a potential of the high voltage line segments.

7. The apparatus of claim 1 wherein the series injection transformer has a non-gapped transformer core of high permittivity material.

8. The apparatus of claim 1 wherein the series injection transformer comprises an active impedance injection module.

9. The apparatus of claim 1 wherein the series injection transformer comprises an active impedance injection module within a housing.

10. For use in a high voltage power distribution system, apparatus comprising:
- an active impedance injection module within a housing, the active injection module having a series injection transformer with a multi-turn primary winding having first and second ends;
- the active impedance injection module being suspended from a tower of the high voltage power distribution system and not by a high voltage line or high voltage line segment of the high voltage power distribution system suspended by the tower;
- an end of first and second high voltage line segments being connected to the tower through first and second strain insulators, respectively; and
- first and second jumpers, a first end of each of the first and second jumpers being connected to a respective of one of the ends of the first and second high voltage line segments;
- the second end of each of the first and second jumpers each being connected to a respective end of the primary winding.

11. The apparatus of claim 10 wherein the tower is a dead-end tower.

12. The apparatus of claim 11 wherein the dead-end tower comprises a suspension tower that has been converted to a dead-end tower.

13. The apparatus of claim 10 wherein the active impedance injection module is suspended from a tower of the high voltage power distribution system by a suspension insulator.

14. The apparatus of claim 13 further comprising a horizontal post insulator coupled between the tower and apparatus and stabilizing the position of the apparatus to prevent or limit high wind movement of the apparatus.

15. The apparatus of claim 10 wherein the active impedance injection module operates at a potential of the high voltage line segments.

16. The apparatus of claim 10 wherein the series injection transformer is a non-gapped series injection transformer.

17. In a high voltage power distribution system, apparatus comprising:
- a plurality of active impedance injection modules, each active injection module having a series injection transformer with a multi-turn primary winding having first and second ends;
- each active impedance injection module being suspended from a respective tower of the high voltage power distribution system by a suspension insulator and not by a high voltage line or high voltage line segment of the high voltage power distribution system suspended by the tower; and
- at each tower having an active impedance injection module:
  - a high voltage line of the high voltage power distribution system being cut into high voltage line segments;
  - an end of the respective first and second high voltage line segments being connected to the respective suspension tower through first and second strain insulators, respectively; and
  - first and second jumpers at each tower having an active impedance injection module, a first end of each of the respective first and second jumpers being connected to a respective of one of the ends of the first and second high voltage line segments;
  - the second end of each of the first and second jumpers being connected to a respective end of the respective primary winding.

18. The apparatus of claim 17 further comprising, at each tower having an active impedance injection module, a horizontal post insulator coupled between the tower and stabilizing the active impedance injection module to prevent or limit high wind movement of the respective active impedance injection module.

19. The apparatus of claim 18 wherein each tower of the high voltage power distribution system is a dead-end tower.

20. The apparatus of claim 19 wherein the dead-end tower comprises a suspension tower that has been converted to a dead-end tower.

21. The apparatus of claim 17 wherein the active impedance injection module operates at a potential of the high voltage line segments.

22. The apparatus of claim 17 wherein the series injection transformer is a non-gapped series injection transformer.

* * * * *